US010425568B2

(12) United States Patent
Kim et al.

(10) Patent No.: US 10,425,568 B2
(45) Date of Patent: Sep. 24, 2019

(54) DISPLAY DEVICE AND SYSTEM AND METHOD FOR CONTROLLING POWER OF THE SAME

(71) Applicant: SAMSUNG ELECTRONICS CO., LTD., Suwon-si, Gyeonggi-do (KR)

(72) Inventors: Ji Won Kim, Seoul (KR); Hyung Joon Kim, Suwon-si (KR); Surng Kyo Oh, Anyang-si (KR); Cheul Hee Hahm, Seongnam-si (KR); Weon Seok Heo, Hwaseong-si (KR); Ji Hyun Bae, Hwaseong-si (KR); Hae Kwang Lee, Seoul (KR); Dong Ryun Seok, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/653,677

(22) Filed: Jul. 19, 2017

(65) Prior Publication Data
US 2018/0054557 A1 Feb. 22, 2018

(30) Foreign Application Priority Data
Aug. 16, 2016 (KR) .................. 10-2016-0103418

(51) Int. Cl.
*H04N 5/232* (2006.01)
*H04N 1/00* (2006.01)
(Continued)

(52) U.S. Cl.
CPC ......... *H04N 5/232* (2013.01); *H04N 1/00206* (2013.01); *H04N 5/4403* (2013.01);
(Continued)

(58) Field of Classification Search
CPC ....... H04N 21/43635; H04N 21/43615; H04N 21/42225; H04N 21/42221; H04N 5/4403; G08C 2201/92; G08C 2201/93
See application file for complete search history.

(56) References Cited

U.S. PATENT DOCUMENTS 6,636,157 B1 10/2003 Sato
7,436,346 B2 10/2008 Walter et al.
(Continued)

FOREIGN PATENT DOCUMENTS

EP 0624958 8/2002
KR 10-0663033 12/2006

OTHER PUBLICATIONS

"HDMI Specification Version 1.3a", Nov. 10, 2006, XP-002476103, Retrieved from URL: http://hdmi.org/download/HDMISpecification13a.pdf on Apr. 8, 2008.
(Continued)

*Primary Examiner* — Brian T Misiura
(74) *Attorney, Agent, or Firm* — Staas & Halsey LLP

(57) ABSTRACT

A display device includes a first communication unit connected to one or more peripheral devices, a second communication unit that communicates with a remote controller, and a processor. If the processor is initialized in response to a power-on instruction through the second communication unit, the processor verifies whether a first peripheral device, which is selected as a source device that provides at least one source of video and audio signals, among the one or more peripheral devices is powered on within a first threshold time. If the first peripheral device is not powered on within the first threshold time, the processor transmits a power-on request for allowing the remote controller to power on the first peripheral device, to the remote controller through the second communication unit.

13 Claims, 11 Drawing Sheets

(51) Int. Cl.
*H04N 21/4363* (2011.01)
*H04N 21/442* (2011.01)
*H04N 5/44* (2011.01)
*H04N 21/4367* (2011.01)
*H04N 5/63* (2006.01)

(52) U.S. Cl.
CPC . *H04N 21/43635* (2013.01); *H04N 21/44227* (2013.01); *H04N 1/00233* (2013.01); *H04N 5/63* (2013.01); *H04N 21/4367* (2013.01)

(56) References Cited

U.S. PATENT DOCUMENTS

| | | | | |
|---|---|---|---|---|
| 8,079,055 | B2* | 12/2011 | Hardacker | H04N 7/163 |
| | | | | 382/321 |
| 8,286,210 | B2* | 10/2012 | Boyden | G09G 5/006 |
| | | | | 710/1 |
| 8,375,150 | B2* | 2/2013 | Guillerm | G09G 5/006 |
| | | | | 710/18 |
| 8,438,408 | B2 | 5/2013 | Louboutin et al. | |
| 8,745,024 | B2 | 6/2014 | Chardon et al. | |
| 8,749,716 | B2* | 6/2014 | Burns | H04N 5/44 |
| | | | | 348/734 |
| 8,875,216 | B2 | 10/2014 | Burns et al. | |
| 9,019,435 | B2* | 4/2015 | Barnett | H04N 5/4403 |
| | | | | 348/734 |
| 9,086,720 | B1* | 7/2015 | Garg | G06F 1/00 |
| 9,124,917 | B2* | 9/2015 | Ahn | H04N 21/42204 |
| 9,179,175 | B2* | 11/2015 | Kim | G08C 19/28 |
| 9,235,257 | B2* | 1/2016 | Richardson | G06F 1/325 |
| 9,239,837 | B2 | 1/2016 | Chardon et al. | |
| 9,686,496 | B2* | 6/2017 | Schafer | H04N 5/4403 |
| 9,723,350 | B2* | 8/2017 | Kim | G08C 17/02 |
| 9,886,233 | B2* | 2/2018 | Innes | G06F 3/165 |
| 2006/0158368 | A1 | 7/2006 | Walter et al. | |
| 2010/0109973 | A1 | 5/2010 | Byun | |
| 2010/0169946 | A1 | 7/2010 | Stanley et al. | |
| 2011/0185204 | A1 | 7/2011 | Louboutin et al. | |
| 2012/0274547 | A1 | 11/2012 | Raeber et al. | |
| 2012/0274863 | A1 | 11/2012 | Chardon et al. | |
| 2012/0278348 | A1 | 11/2012 | Chardon et al. | |
| 2013/0088643 | A1* | 4/2013 | Lee | H04N 5/4403 |
| | | | | 348/563 |
| 2014/0132844 | A1 | 5/2014 | Burns et al. | |
| 2014/0253817 | A1 | 9/2014 | Burns et al. | |
| 2014/0267933 | A1* | 9/2014 | Young | H04N 21/42203 |
| | | | | 348/734 |
| 2014/0337879 | A1* | 11/2014 | Arling | H04N 21/812 |
| | | | | 725/32 |
| 2017/0048577 | A1* | 2/2017 | Chiou | H04N 21/42225 |
| 2018/0091845 | A1* | 3/2018 | Lee | H04N 21/42208 |
| 2018/0091851 | A1* | 3/2018 | Bae | H04N 21/4432 |

OTHER PUBLICATIONS

International Search Report dated Oct. 20, 2017, in corresponding International Patent Application No. PCT/KR2017/007234.
Extended European Search Report dated Oct. 25, 2017, in corresponding European Patent Application No. 17181507.9.

* cited by examiner

DISPLAY DEVICE AND SYSTEM AND METHOD FOR CONTROLLING POWER OF THE SAME

CROSS-REFERENCE TO RELATED APPLICATION(S)

This application claims the benefit under 35 U.S.C. § 119(a) of a Korean patent application filed on Aug. 16, 2016 in the Korean Intellectual Property Office and assigned Serial number 10-2016-0103418, the entire disclosure of which is hereby incorporated by reference.

TECHNICAL FIELD

Various embodiments of the present invention relate to a display device, and a system and a method for controlling power of the same.

BACKGROUND

High-Definition Multimedia Interface (HDMI) is a multimedia interface for transmitting an uncompressed digital audio/video signal through a single cable.

The HDMI may provide an interface between a source device (peripheral device) such as an audio/video source, a set-top box and the like and a sink device such as a monitor, a digital TV and the like.

SUMMARY

A sink device (e.g., a digital TV) requires two remote controller operations to receive a source video from a source device connected thereto through an HDMI when being powered on.

Various embodiments of the present invention disclose a display device capable of automatically powering on a peripheral device, and a system and a method for controlling power of the same.

In accordance with one aspect of the present invention, a display device includes a first communication unit that communicates with one or more peripheral devices, a second communication unit that communicates with a remote controller, and a processor operatively connected to the first and second communication units. The processor is initialized in response to a power-on instruction through the second communication unit from the remote controller and verifies whether a first peripheral device is powered on within a first threshold time, through the first communication unit. If the first peripheral device is not powered on within the first threshold time, the processor transmits, to the remote controller, a power-on request for allowing the remote controller to power on the first peripheral device. The first peripheral device is set as a source device corresponding to one, which provides at least one source of video and audio signals, among the one or more peripheral devices.

In accordance with another aspect of the present invention, a power control system includes a remote controller that includes a power-on key and transmits a power-on instruction when the power-on key is operated, and a display device that includes a first interface electrically connected to a first peripheral device that provides at least one source of video and audio signals. The display device is configured to verify whether the first peripheral device is powered on within a first threshold time when the display device is initialized in response to the power-on instruction, and to transmit, to the remote controller or the first interface, a power-on request for powering on the first peripheral device when the first peripheral device is not powered on within the first threshold time.

In accordance with still another aspect of the present invention, a method of controlling power by at least one processor includes transmitting a signal for resetting a current set source device or a changed source device through a first interface, verifying whether at least one source of video and audio signals is received from the source device within a first threshold time from a first time point when the signal is transmitted, and transmitting a power-on request for powering on the source device to a remote controller when the at least one source is not received within the first threshold time from the first time point.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
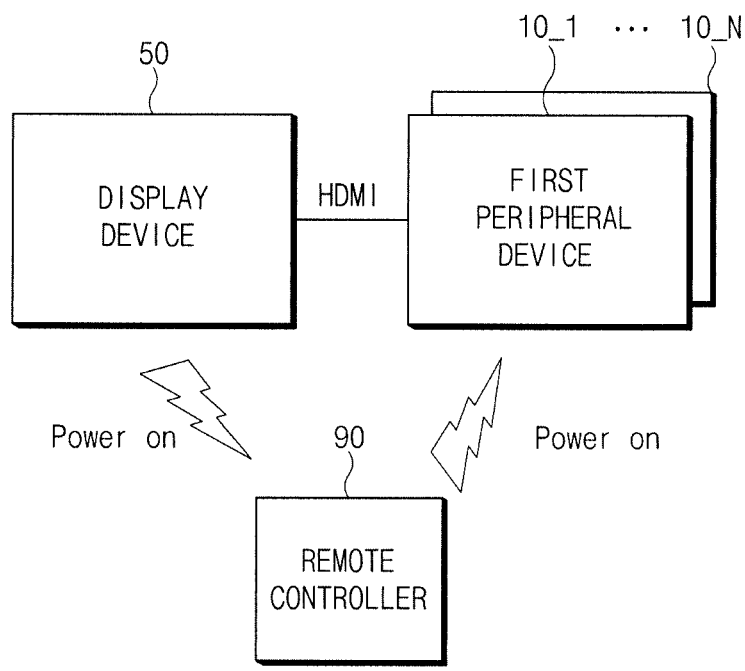
FIG. 1 is a block diagram illustrating a power control system according to an embodiment of the present invention.

Various embodiments of the present invention may be described with reference to accompanying drawings. Accordingly, those of ordinary skill in the art will recognize that modification, equivalent, and/or alternative on the various embodiments described herein can be variously made without departing from the scope and spirit of the present invention. With regard to description of drawings, similar elements may be marked by similar reference numerals.

FIG. 1 is a block diagram illustrating a power control system according to an embodiment of the present invention.

Referring to FIG. 1, a power control system according to an embodiment may include a remote controller 90, at least one peripheral device 10 (10_1 to 10_N), and a display device 50.

According to an embodiment, the remote controller 90 may include a plurality of buttons. When a user operates a button, the remote controller may transmit an instruction corresponding to the operated button. The remote controller 90 may transmit an instruction identifiable by the at least one peripheral device 10 and the display device 50. For example, the remote controller 90 may be a dedicated remote controller for controlling the display device 50 and the peripheral device 10. As another example, the remote controller 90 may be a terminal (such as a smart phone) communicating with the display device 50 in various communication schemes.

According to an embodiment, the remote controller 90 may control another peripheral device 10 or the display device 50 in response to a request from the display device 50. For example, when the remote controller 90 receives a power-on request from the display device 50, the remote controller 90 may power on at least one peripheral device 10 in response to the power-on request.

According to an embodiment, the remote controller 90 may communicate with the display device 50 and the at least one peripheral device 10 in various schemes. For example, the remote controller 90 may communicate in at least one of infrared communication or Bluetooth communication. In one embodiment, the remote controller 90 may communicate with the display device 50 and the at least one peripheral device 10 in the same scheme or different communication schemes.

According to an embodiment, the at least one peripheral device 10 may be connected to the display device 50 through a first interface such that the at least one peripheral device 10 transmits at least one source of video and audio signals to the display device 50. For example, the at least one peripheral device 10 may be connected to the display device 50 through an HDMI such that the at least one peripheral device 10 provides the video and audio signals to the display device 50 through the HDMI. For example, the at least one peripheral device 10 may be various source output devices such as a DVD player, a set top box, a cable receiver, a satellite broadcast receiver, a personal computer, and the like.

According to an embodiment, the display device 50 may be provided with a source (at least one of video and audio signals) from a peripheral device through various interfaces (e.g., wired or wireless). For example, the display device 50 may include various display devices such as a digital TV, a monitor, a projector, and the like. The wired interface may include an interface capable of outputting an image, such as HDMI, DVI, and the like. In this disclosure, as an example, the case where the display device 50 is connected to the peripheral device 10 through the HDMI will be described.

According to an embodiment, the display device 50 may detect a first peripheral device electrically connected to a currently selected channel (HDMI) among at least one peripheral device 10 when the display device 50 is initialized (booted). In the embodiment, when the display device 50 is initialized, the display device 50 may identify unique identification information of the at least one peripheral 10 connected to each interface provided thereto. For example, the unique identification information may include at least one of an identifier, manufacturer, a model name, and the like.

According to an embodiment, the display device 50 may verify whether a peripheral device exists at the currently (finally) selected channel. The display device 50 may determine the verified peripheral device as a source device (hereinafter, referred to as a "first peripheral device"). If any peripheral device connected to the currently selected channel does not exist, the display device 50 may inform a user of the absence of the peripheral device connected to the selected channel.

According to an embodiment, when the display device 50 is powered on in response to the power-on instruction of the remote controller 90, the display device 50 may verify whether the first peripheral device of the selected channel is powered on. For example, the display device 50 transmits a signal for resetting the first peripheral device through HDMI, and when at least one signal is received within a first threshold time from the time point when the signal is transmitted, the display device 50 may determine that the first peripheral device is powered on. For example, the at least one signal may be a transition minimized differential signaling (TMDS) signal of HDMI. The first threshold time may be determined from a result of learning a power-on required time of the first peripheral device. For example, the first threshold time may be a time determined by adding a specified additional time to the power-on required time of the first peripheral device. When there is no pre-learned power-on required time for the first peripheral device, the first threshold time may be a specified default time (e.g., 5 seconds).

According to an embodiment, the display device 50 may automatically power on the first peripheral device if the first peripheral device is not powered on within the first threshold time. For example, if the first peripheral device is a device supporting an HDMI-CEC function, the display device 50 may power on the first peripheral device via the HDMI. As another example, when the first peripheral device is a device that does not support the HDMI-CEC function, the display device 50 may power on the first peripheral device through the remote controller 90. In an embodiment, the display device 50 may verify whether each peripheral device supports the HDMI-CEC function while verifying the source device connected to each interface channel.

According to an embodiment, the display device 50 may request the remote controller 90 to power on the first peripheral device. For example, the display device 50 may transmit a power-on request including a unique identifier of the first peripheral device to the remote controller 90. In one embodiment, when the remote controller 90 receives the power-on request, the remote controller 90 may verify the first peripheral device to be powered on based on the unique identification information included in the power-on request, and may transmit a power-on instruction to the first peripheral device such that the first peripheral device is powered on.

According to an embodiment, the display device 50 may verify whether the first peripheral device is initialized while waiting for a second threshold time from the transmission time of the power-on request or the power-on instruction even after the first threshold time has elapsed. The second threshold time may be determined by adding a specified additional time to the latest power-on required time of the first peripheral device previously learned. When the previously learned power-on required time does not exist, a default value determined based on an experiment value may be determined as the second threshold time.

According to an embodiment, the display device 50 may display a specified UI image if the first peripheral device is not initialized within the second threshold time. For example, the specified UI image may be an image informing the user that the automatic power-on of the first peripheral device is failed.

According to an embodiment, the display device 50 may re-learn the power-on time of the first peripheral device while controlling the automatic power-on of the first peripheral device. For example, the display device 50 may re-learn the power-on required time of the first peripheral device every time when the display device 50 is initialized.

According to an embodiment, the display device 50 may update at least one of the first and second threshold times using the re-learned power-on required time. For example, the display device 50 may update at least one of the first and second threshold times by summing (e.g., averaging) the re-learned power-on time and the previously learned power-on time.

According to another embodiment, the at least one peripheral device 10 may power on the display device 50. Each peripheral device 10 may request the remote controller 90 to power on the display device 50 when being powered on. To this end, each peripheral device 10 may store the unique identification information and specification information such as resolution of the previously verified display device 50. The display device 50 may reproduce only the source from the currently selected channel even if each peripheral device 10 is initialized so that the source is provided to each interface channel.

According to another embodiment, in addition to power-on of the peripheral device 10, when the channel is changed, the display device 50 may verify whether the peripheral device 10 connected to the changed channel is powered on and may power on the peripheral device 10 through the HDMI-CEC or the remote controller 90. The display device 50 may monitor whether a source signal from any other interface except for the HDMI is detected and may power on the second peripheral device connected to the any other interface is powered on through the remote controller 90.

According to various embodiments, the display device 50 may be connected to the peripheral devices 10 through another wired/wireless interface (such as DVI).

According to various embodiments, when a user powers on the display device, the first peripheral device connected through HDMI may be automatically powered on without any user intervention. Thus, in various embodiments, the usability of a display device using HDMI may be greatly improved.

In various embodiments, the display device may automatically power on a peripheral device which is connected thereto through HDMI and does not support HDMI-CEC.

Figure 2:
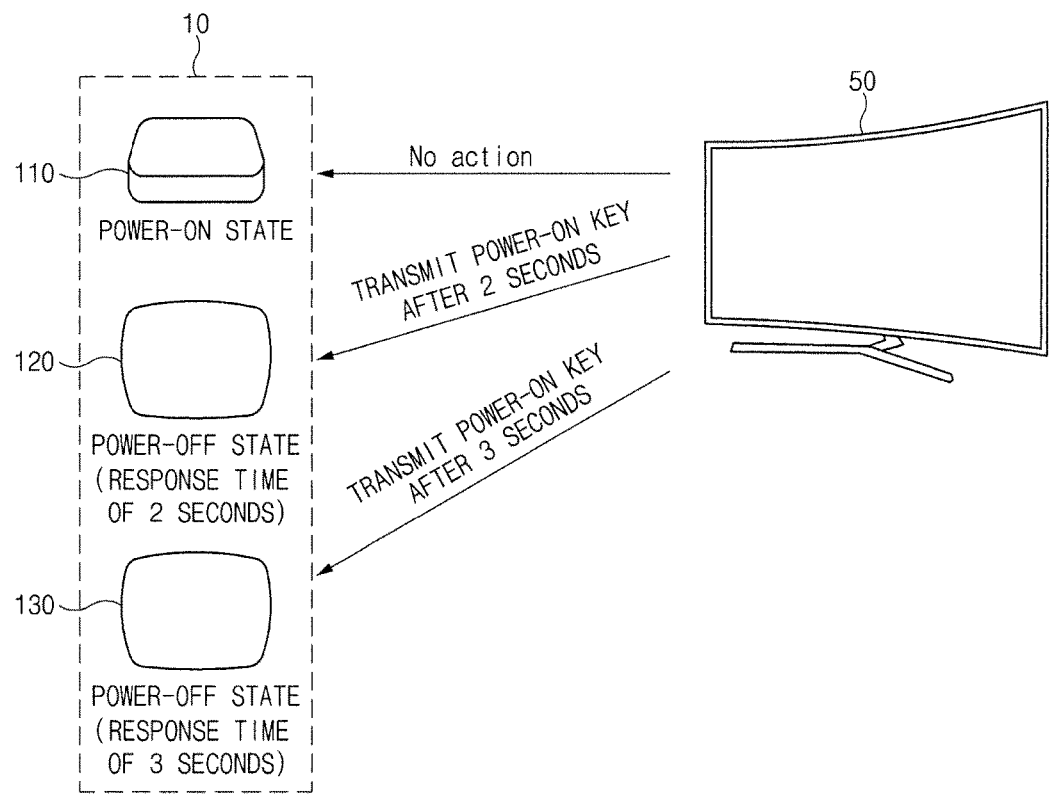
FIG. 2 is a view illustrating a deviation between the power-on times of plural peripheral devices according to an embodiment of the present invention.

FIG. 2 is a view illustrating a deviation between the power-on times of plural peripheral devices according to an embodiment of the present invention.

Referring to FIG. 2, according to an embodiment, the peripheral devices may have different power-on times. For example, a second peripheral device 120 may take two seconds to be powered on and a third peripheral device 130 may take three seconds to be powered on.

According to an embodiment, the display device 50 may not separately perform an operation for automatic power-on if a first peripheral device 110 connected to the currently selected channel is powered on. On the other hand, the display device 50 may perform the operation for power-on of the corresponding source device, such as the second or third peripheral device 120 or 130, when the source device connected to the currently selected channel is powered off.

According to an embodiment, the display device 50 may determine the threshold time for verifying whether each peripheral device is powered on, based on the power-on required time of each peripheral device. For example, the display device 50 may set the threshold time of the second peripheral device 120 using the power-on required time (2 seconds) of the second peripheral device 120. The display device 50 may set the threshold time of the third peripheral device 130 using the power-on required time (3 seconds) of the third peripheral device 130.

Figure 3:
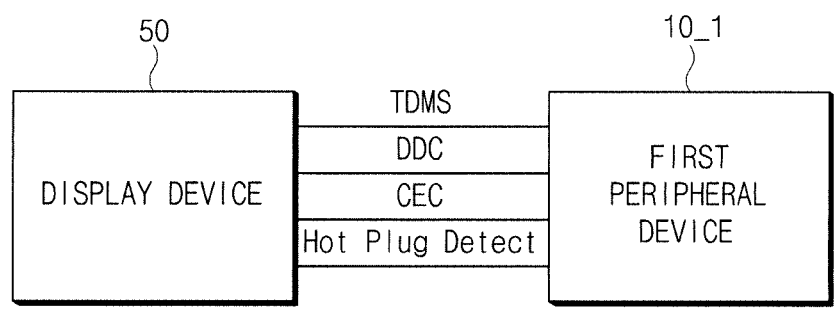
FIG. 3 is a block diagram illustrating details of HDMI between a display device and a first peripheral device according to an embodiment of the present invention.

FIG. 3 is a block diagram illustrating details of HDMI between a display device and a first peripheral device according to an embodiment of the present invention.

As shown in FIG. 3, HDMI may include three independent communication channels divided into a transition minimized differential signaling (TMDS) channel, a display data channel (DDC) and a consumer electronics control (CEC) channel. The HDMI may include a hot-plug interface. The hot-plug interface may be an interface for transmitting a hot-plug detect signal for detecting (hot-plug detecting) a device connected through an HDMI. In an embodiment, the display device 50 may transmit the hot-plug detect signal (or a reset signal) for resetting each peripheral device through the hot-plug detect interface.

The TMDS channel may be a channel for transmitting and receiving a video signal and an audio signal included in a moving image signal (or a TMDS signal). The TMDS channel may support data transmission of five Gbps or less. In one embodiment, the display device 50 may verify whether the TMDS signal is received through the TMDS channel within the first threshold time, based on the output time point of the hot-plug detect signal. Since the first peripheral device powered on outputs the TMDS signal through the TMDS channel, when the display device 50 receives at least one of TMDS signals, the display device 50 may verify the state in which the first peripheral device is powered on.

The DDC channel may be a channel through which the display device 50 transmits detailed information about the display device 50 to the at least one peripheral device 10. The at least one peripheral device 10 may transmit a moving image signal corresponding to the display environment of the display device 50 by using the detailed information about the display device 50.

The CEC channel may be a channel for transmitting and receiving a control instruction between the display device 50 and the at least one peripheral device 10. In one embodiment, the display device 50 may automatically power on the first peripheral device using the HDMI-CEC function when the first peripheral device supports the HDMI-CEC function. The HDMI-CEC function may be a function of controlling consumer electronics control (CEC) based products through the CEC channel of the HDMI. The HDMI-CEC function may be an optional function of the HDMI. For example, the HDMI-CEC function may include automatic power-on, automatic signal routing and single-point remote control functions of the CEC-based products.

Figure 4:
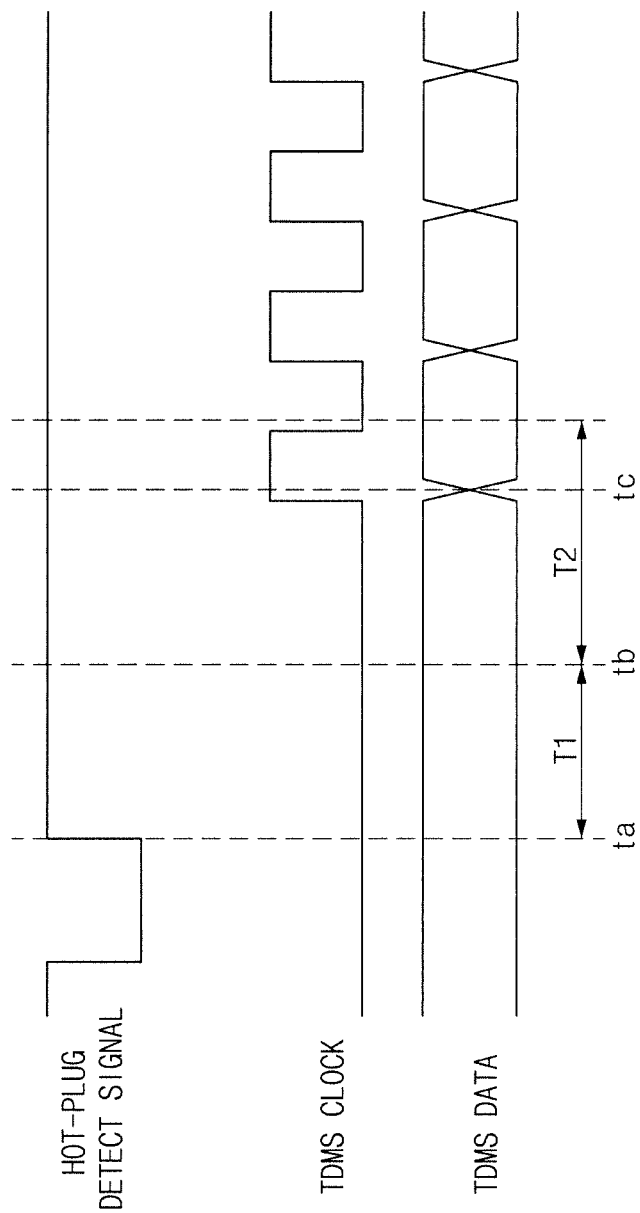
FIG. 4 is a timing diagram illustrating a reset signal of a first peripheral device according to an embodiment of the present invention.

FIG. 4 is a timing diagram illustrating a reset signal of a first peripheral device according to an embodiment of the present invention.

The hot-plug detect function may be performed by transmitting the hot-plug detect signal (e. g. reset signal) through the hot-plug interface of HDMI. As shown in FIG. 4, the hot-plug detect signal may be a low active signal. Alternatively, the hot-plug detect signal may be a high active signal. For example, the hot-plug detect signal may be pin number 19 of an HDMI connector.

According to an embodiment, when the display device 50 detects a state transition of a monitoring signal (e.g., a TMDS signal) within the first threshold time from a first time point 'W.' at which a reset signal is transmitted, the display device 50 may determine that the first peripheral device is powered on. For example, when the monitoring signal is transitioned to a state different from that before the power-on of the first peripheral device through a GPIO pin, the display device 50 may determine that the first peripheral device is powered on. In an embodiment, the monitoring signal may be a TMDS signal. For example, the monitoring signal may be at least one of a TMDS clock and a TMDS signal including TMDS data.

According to an embodiment, if the display device 50 does not detect the state transition of the monitoring signal within the first threshold time, the display device 50 may request the power-on of the first peripheral device through the remote controller 90 or the CEC channel of HDMI.

In an embodiment, the display device 50 may verify whether the first peripheral device is powered on, while waiting for a second threshold time T2 from the first time point 'tb' when the power-on request is transmitted. When the first peripheral device is powered on within the second threshold time from the first time point 'tb' (at 'tc'), the display device 50 may reproduce (or output) a source received from the first peripheral device. Alternatively, if the first peripheral device is not powered on even after the second threshold time has elapsed, the display device 50 may inform through a screen that the source device is powered off.

Figure 5:
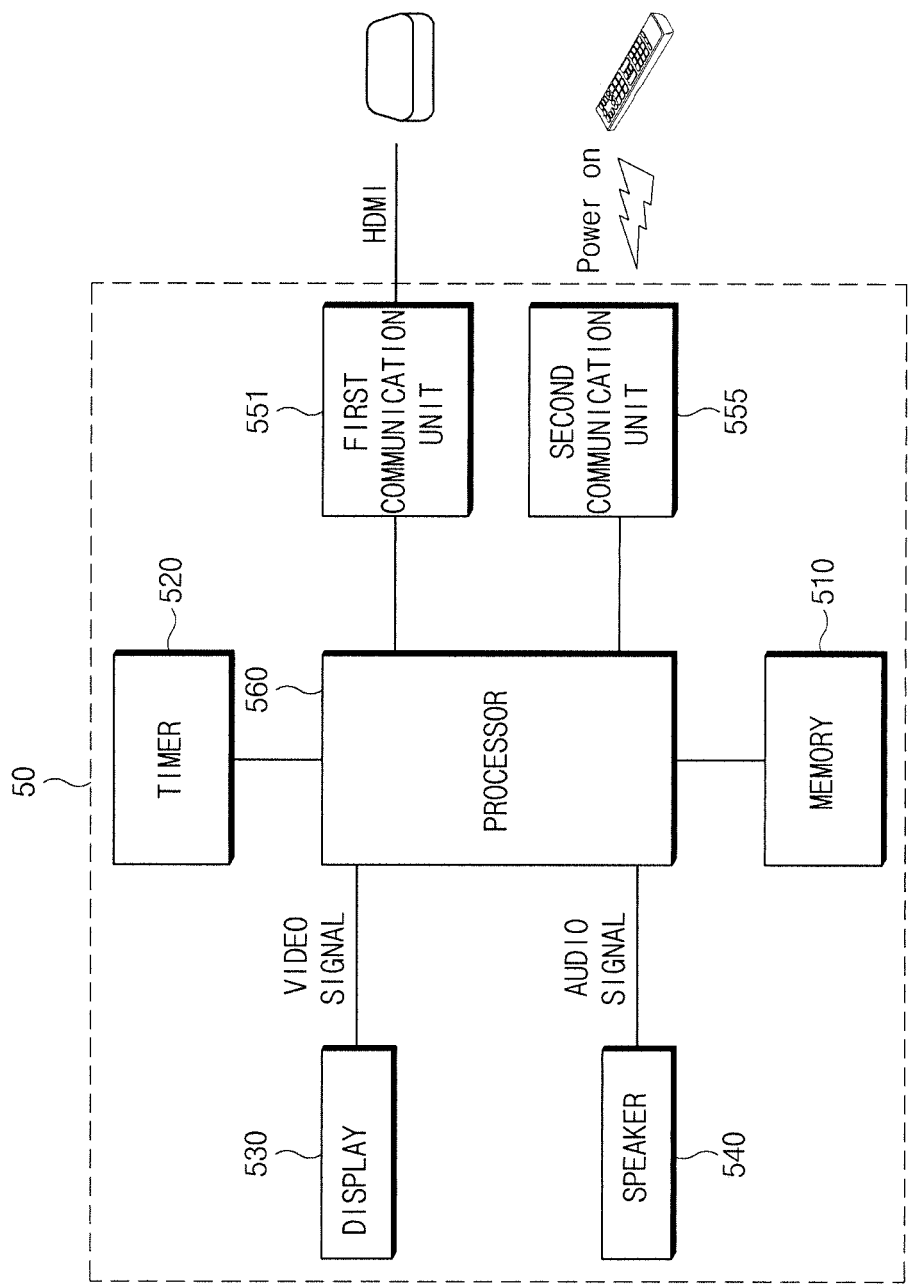
FIG. 5 is a block diagram illustrating a display device according to an embodiment of the present invention.

FIG. 5 is a block diagram illustrating a display device according to an embodiment of the present invention.

As shown in FIG. 5, the display device 50 according to an embodiment of the present invention may include a memory 510, a timer 520, a display 530, a speaker 540, a first communication unit 551, a second communication unit 555, and a processor 560. Each element of the display device 50 according to an embodiment may be a separate hardware module or a software module implemented through at least one processor. For example, the functions performed by each element included in the display device 50 may be performed by one processor, or each separate processor.

The memory 510 may be a volatile memory (e.g., a RAM, etc.), a non-volatile memory (e.g., a ROM, flash memory, etc.), or the combination thereof. According to an embodiment, the memory 510 may store peripheral device information required for power-on control of each peripheral device. For example, the peripheral device information may be at least one of unique identification information of each peripheral device, the first threshold time, the second threshold time, and information about whether the HDMI-CEC function is supported.

According to an embodiment of the present invention, the timer 520 may be driven in response to an instruction of the processor 560 to measure time. In one embodiment, the processor 560 may operate the timer 520 at a first time point at which the first peripheral device is reset such that the processor 560 verifies the time taken from the first time point. In another embodiment, the processor 560 may operate the timer 520 at a second time point when a power-on request is transmitted to the remote controller 90 such that the time required to power on the first peripheral device is measured. The processor 560 may stop and initialize the timer 520 for later measurements after the time measurement. The timer 520 may be included in the processor 560.

For example, the display 530 may include a liquid crystal display (LCD), a light emitting diode (LED) display, an organic light emitting diode (OLED) display, or an electronic paper display. According to an embodiment, the display 530 may display an image signal based on an instruction of the processor 560. For example, the processor 560 may receive a video signal corresponding to the resolution of the display 530 from the first peripheral device through the HDMI during watching through HDMI, and output the received video signal to the display 530.

According to an embodiment, the speaker 540 may output an audio signal in response to an instruction of the processor 560. The processor 560 may receive the audio signal from the first peripheral device through HDMI, and may output the audio signal through the speaker 540 after converting the audio signal to be matched with the specification of the speaker 540.

According to an embodiment, the first communication unit 551 may support communication between the at least one peripheral device 10 and the processor 560 connected through HDMI. For example, the first communication unit 551 may convert the HDMI standard signal received from the at least one peripheral device 10 into a signal that is interpretable by the processor 560. The first communication unit 551 may convert the signal from the processor 560 into an HDMI standard signal.

According to an embodiment, the second communication unit 555 may support communication between the remote controller 90 and the processor 560. For example, the second communication unit 555 may convert the power-on instruction from the remote controller 90 into a signal that is interpretable by the processor 560. For example, the second communication unit 555 may transmit a power-on request from the processor 560 to the remote controller 90.

According to an embodiment, when receiving the power-on instruction from the remote controller 90 through the second communication unit 555, the processor 560 may be initialized in response to the power-on instruction. The processor 560 may verify whether at least one peripheral device 10 connected through the HDMI exists and verify the currently selected source device (the first peripheral device) after the processor 560 is initialized.

According to an embodiment, the processor 560 may verify whether the first peripheral device is powered on, by verifying the response time of the first peripheral device to the hot-plug signal through the CEC channel of the HDMI. For example, the processor 560 may transmit a hot-plug signal for resetting the first peripheral through the hot-plug interface when being initialized in response to a power-on request of the remote controller 90. The processor 560 may verify whether a state of the monitoring signal from the first peripheral device, which is initialized after being reset, transitions on the TMDS channel. When the processor 560 detects the state transition of the monitoring signal within the first threshold time at the first time point when the hot-plug signal is transmitted, the processor 560 may determine that the first peripheral device is powered on.

In an embodiment, for example, the first threshold time may be determined by adding a specified additional time to the result of learning the power-on required time of the first peripheral device based on the first time point. The first threshold time may be a default time for a peripheral device that does not previously learn the power on required time. In an embodiment, the processor 560 may update the first threshold time by learning the power on required time based on the reset time point every time when the first peripheral device is powered on. According to an embodiment, the accuracy of determining whether the first peripheral device is initialized may be increased.

According to an embodiment, when the processor 560 fails to detect the power-on of the first peripheral device through one power-on detection attempt, the processor 560 may re-reset the first peripheral device to perform a second power-on detection attempt.

According to an embodiment, the processor 560 may verify whether the first peripheral device supports the HDMI-CEC function from the memory 510, and may power on the first peripheral device in a manner defined according to whether the HDMI-CEC function is supported. For example, the processor 560 may transmit a power-on instruction to the first peripheral device through the CEC channel of the HDMI when the first peripheral device supports the HDMI-CEC function. In one embodiment, the first peripheral device supporting the HDMI-CEC function may be powered on in response to the power-on instruction when receiving the power-on instruction through the HDMI CEC channel. As another embodiment, processor 560 may transmit the power-on request to the remote controller 90 through the second communication unit 555 if the first peripheral does not support the HDMI-CEC function. For example, the power-on request may include unique identification information of the first peripheral device and a request of instructing to transmit the power-on instruction to the first peripheral device. In this case, the second communication unit 555 may transmit the power-on request to the remote controller 90, and the remote controller 90 may transmit the power-on instruction to the first peripheral device such that the first peripheral device is powered on.

According to an embodiment, the processor 560 may monitor whether the first peripheral device is powered on within the second threshold time at a time point when the request of powering on the first peripheral device is transmitted. In an embodiment, the processor 560 may determine whether the first peripheral device is powered on, based on whether the monitoring signal of the TMDS channel is transitioned.

According to an embodiment, the second threshold time may be determined based on the latest time of the power-on required times of the first peripheral device. For example, the second threshold time may be determined by adding a specified additional time to the latest time of the power-on required times previously learned. The specified additional time may be determined in consideration of the transmission/reception time of the power-on request of the first peripheral device and the power-on instruction transmission/reception time of the remote controller by the first peripheral device.

According to an embodiment, the processor 560 may output a specified UI image to the display 530 when the first peripheral device is not powered on within the second threshold time. For example, the specified UI image may be a UI image informing the user of the fact that the source cannot be received through HDMI.

According to an embodiment, even when the channel (or interface) of the source is changed by the user, the processor 560 may power on the peripheral device 10 connected to the changed channel through the HDMI-CEC or the remote controller 90. For example, the processor 560 may monitor whether a source signal from any other interface except for the HDMI is detected and may power on the second peripheral device connected to the any other interface through the remote controller 90.

According to an embodiment, the processor 560 may power on at least one peripheral device even when the processor 560 is powered on in response to a user input through an interface other than the second communication unit 555. For example, the processor 560 may power on at least one peripheral device when detecting that a power-on button provided on the display device 50 is operated.

According to various embodiments, as the display device is powered on through the remote controller, the peripheral device connected to the display device may be automatically powered on, so that the user convenience may be greatly improved when the display device interfaces with the peripheral device through HDMI. According to various embodiments, an HDMI-based peripheral device which does not support the HDMI-CEC may be automatically powered on.

Figure 6:
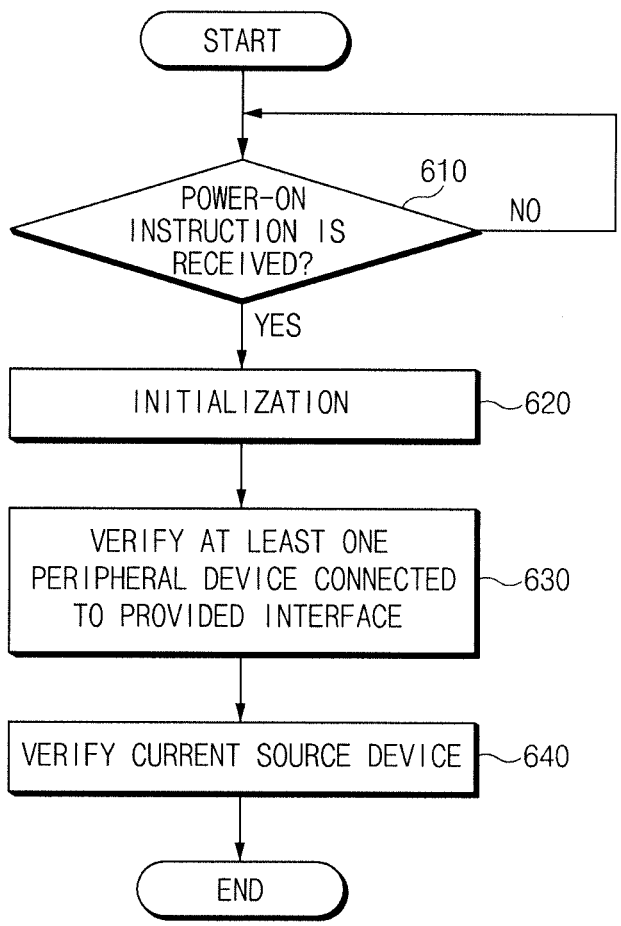
FIG. 6 is a flowchart illustrating a method of identifying a peripheral device according to an embodiment of the present invention.

FIG. 6 is a flowchart illustrating a method of identifying a peripheral device according to an embodiment of the present invention.

Referring to FIG. 6, if the processor 560 receives a power-on instruction from the remote controller 90 in operation 610, in operation 620, the processor 560 may be initialized. For example, if the processor 560 receives the power-on instruction from the remote controller 90 through the second communication unit 555, the processor 560 may be initialized while receiving operation power. If the processor 560 is initialized, the processor 560 may output the source image received from the peripheral device 10.

In operation 630, if processor 560 is initialized, the processor 560 may verify whether a peripheral device connected to an interface exists for all interfaces capable of receiving a source. If the peripheral device 10 connected to each interface exists, the processor 560 may identify the unique identification information of the corresponding peripheral device 10 and may store the identified unique identification information in association with each interface.

In operation 640, the processor 560 may identify the first peripheral device selected as the current source device from the plurality of peripheral devices or the first peripheral device connected to the currently selected channel. For example, the processor 560 may identify the first peripheral device by verifying the channel information that is finally selected by the user and is stored in the memory 510.

In various embodiments, information about whether a source device exists and information necessary to power on the source device may be verified if the display device is initialized.

Figure 7:
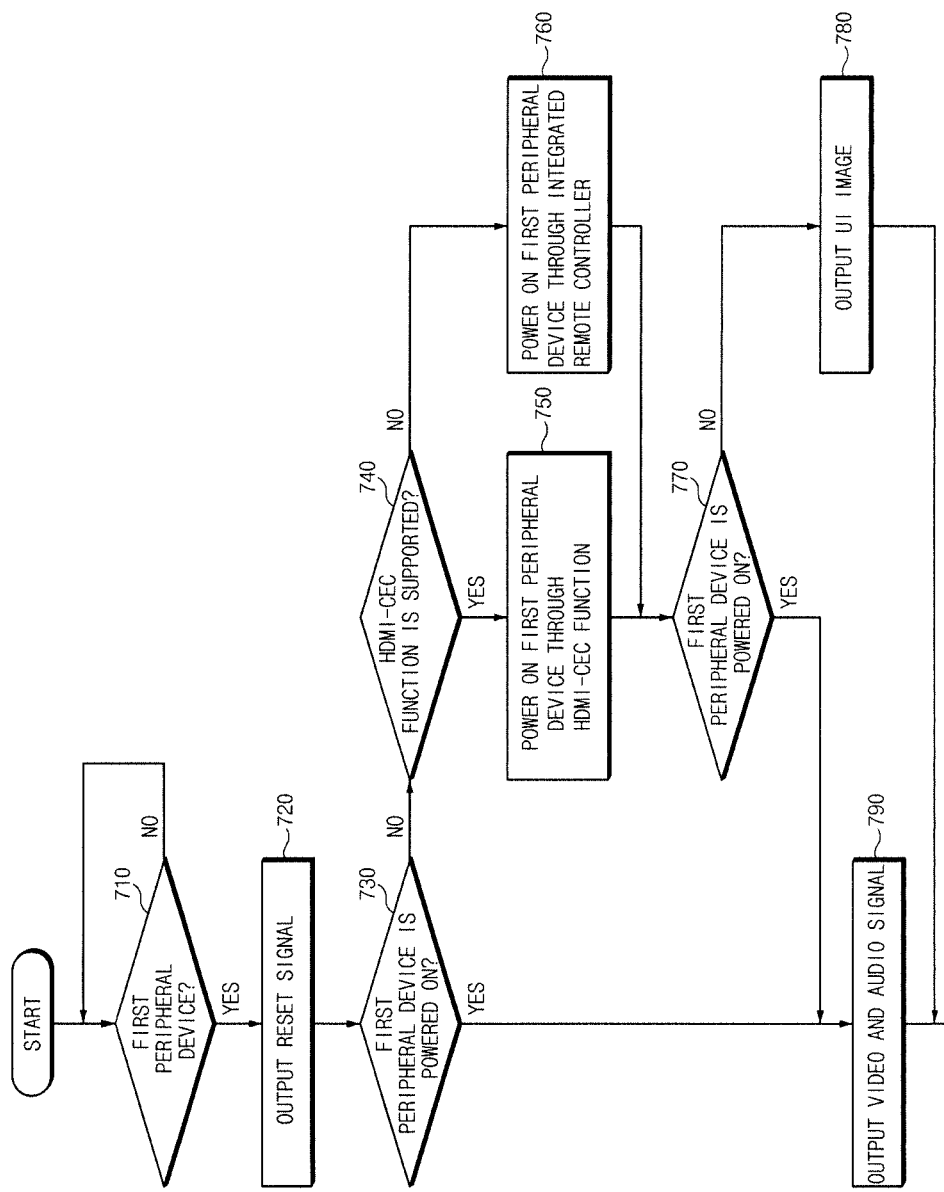
FIG. 7 is a flowchart illustrating a method of controlling power of a peripheral device according to an embodiment of the present invention.

FIG. 7 is a flowchart illustrating a method of controlling power of a peripheral device according to an embodiment of the present invention.

Referring to FIG. 7, in operation 710, the processor 560 is initialized if receiving a power-on instruction from the remote controller 90, such that the processor 560 verifies the source device of the currently selected channel. In operation 710, the processor 560 may verify that the currently selected channel is an HDMI and the source device connected to the HDMI is the first peripheral device, based on the information about the channel finally selected by the user from the memory 510.

In operation 720, if the processor 560 is initialized, the processor 560 may output a reset signal for resetting the first peripheral device. For example, the processor 560 may reset the first peripheral device by transitioning the state of the hot-plug detect signal of the HDMI (e.g., transitioning from a high state to a low state).

In operation 730, the processor 560 may verify whether the first peripheral is powered on. For example, the processor 560 may verify whether the monitoring signal is received from the first peripheral device within a first threshold time from a first time point at which the reset signal is transmitted. The processor 560 may determine that the first peripheral device is powered on if the monitoring signal is received from the first peripheral device within the first threshold time from the first time point. For example, the monitoring signal may be at least one of TMDS data and a TMDS clock.

If the first peripheral device is not powered on within the first threshold time from the first time point, in operation 740, the processor 560 may verify whether the first peripheral device supports the HDMI-CEC function. For example, the processor 560 may search the memory 510 for information about a peripheral device and may verify from the peripheral device information whether the first peripheral device supports the HDMI-CEC function.

If the first peripheral device supports the HDMI-CEC function, in operation 750, the processor 560 may transmit an instruction to power on the first peripheral device through the CEC channel of the HDMI.

If the first peripheral device does not support the HDMI-CEC function, in operation 760, the processor 560 may request the remote controller 90 to power on the first peripheral device through the second communication unit 555. For example, the processor 560 may transmit, to the remote controller 90, a power-on request including at least one of the unique identification information and the power-on key information of the first peripheral device. If receiving the power-on request, the remote controller 90 may transmit, to the first peripheral device, a power-on instruction of instructing the first peripheral device to be powered on.

In operation 770, the processor 560 may verify whether the first peripheral device is powered on in response to the power-on request. For example, the processor 560 may determine that the first peripheral device is powered on if the state transition of the monitoring signal occurs within a second threshold time from a second time point at which the request of powering on the first peripheral device is transmitted.

In operation 780, the processor 560 may output the specified guide UI image if the first peripheral device is not powered on with the second threshold time from the second time point. For example, the guide UI image may be an image for informing of the power-off of the currently selected source device. If the processor 560 verifies the power on of the first peripheral device while outputting the guide UI image, the processor 560 may provide the HDMI watching service. For example, the HDMI watching service may be a service for outputting the source received through the HDMI to at least one of the display 530 and the speaker 540.

In operation 790, if the processor 560 receives the video and audio signals from the first peripheral device within the second threshold time from the second time point, the processor 560 may output the received video and audio signals through the display 530 and the speaker 540.

In various embodiments, the accuracy of the automatic power-on control of the first peripheral device may be improved by learning the initialization time of the first peripheral device selected as the current source device and determining whether the first peripheral device is powered on based on the learned initialization time According to various embodiments, a display device and a peripheral device may be powered on in response to one user request of powering on the display device, and a peripheral device that does not support the HDMI-CEC may be also powered on.

Figure 8:
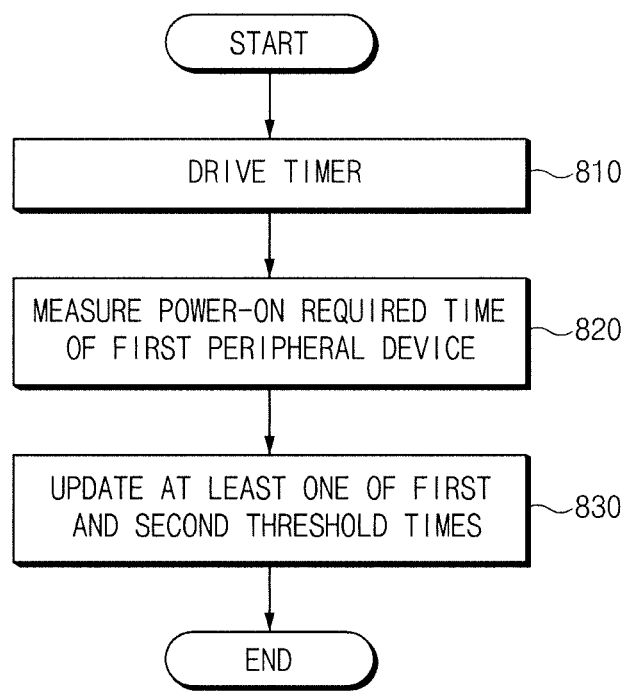
FIG. 8 is a flowchart illustrating a method of learning a power-on time according to an embodiment of the present invention.

FIG. 8 is a flowchart illustrating a method of learning a power-on time according to an embodiment of the present invention.

Referring to FIG. 8, in operation 810, if initialized, the processor 560 drives the timer 520 at a first time point at which a reset signal for resetting the peripheral device 10 is output. The processor 560 may be powered on by the remote controller 90 and powered on by the operation of a power button provided on the display device 50.

In operation 820, the processor 560 may verify whether the first peripheral device is powered on and may measure the power-on required time of the first peripheral device based on the first time point by using the timer 520.

In operation 830, if the power-on required time of the first peripheral device is measured, the processor 560 may update at least one of first and second threshold times and store the updated result in the memory 510. For example, the processor 560 may determine the first threshold time by adding a specified additional time to the first measured power-on required time of the first peripheral device. The processor 560 may update the first threshold time by summing the power-on required time of the first peripheral device currently measured and the previously measured power-on required time. As another example, the processor 560 may determine the second threshold time by using the latest of the power-on required times of the first peripheral device.

In various embodiments, the processor 560 may perform operations 810 through 830 with the automatic power-on control described above (see FIG. 7).

According to various embodiments, it is possible to more accurately determine whether each peripheral device is powered on by re-learning the power-on required time of each peripheral device to update the first threshold time.

Figure 9A:
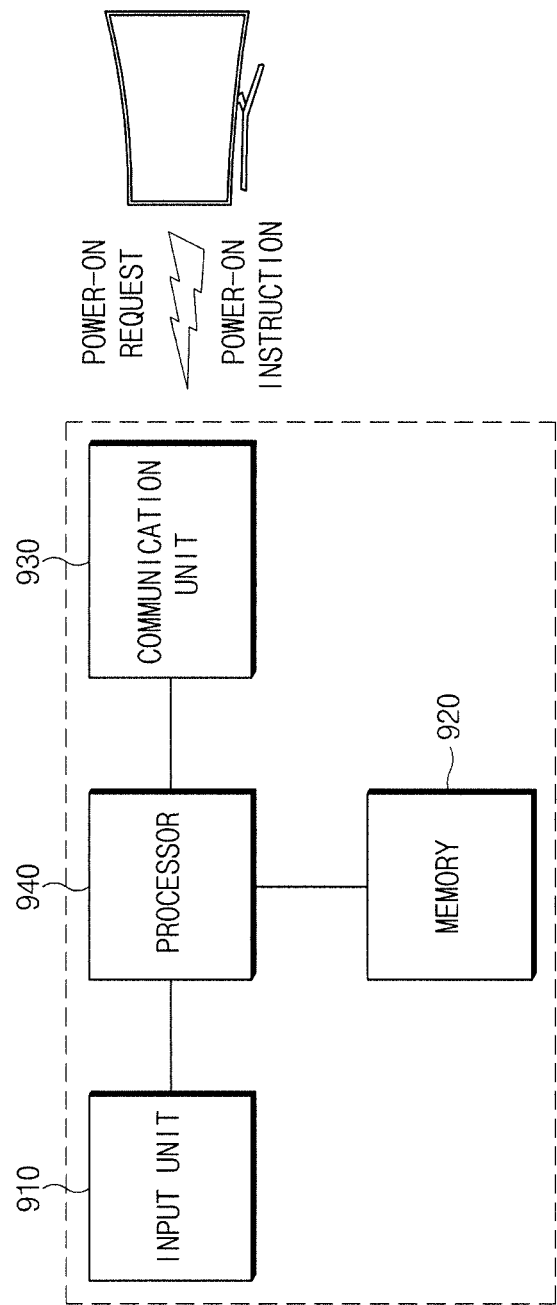
FIG. 9A is a block diagram illustrating a remote controller according to an embodiment of the present invention.
Figure 9B:
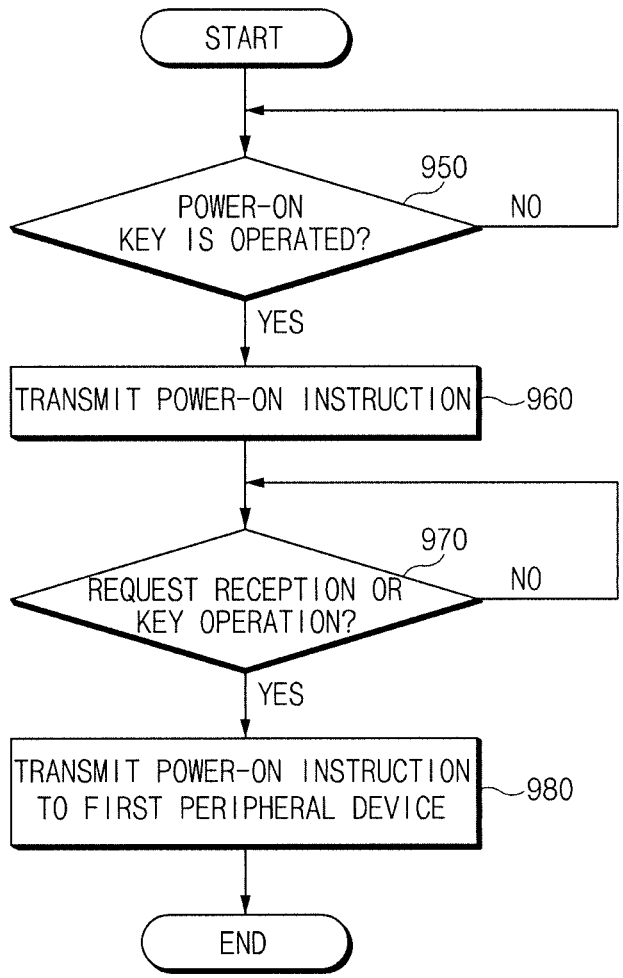
FIG. 9B is a flowchart illustrating a method of controlling power of a peripheral device by a remote controller according to an embodiment of the present invention.

FIG. 9A is a block diagram illustrating a remote controller according to an embodiment of the present invention. FIG. 9B is a flowchart illustrating a method of controlling power of a peripheral device by a remote controller according to an embodiment of the present invention.

As shown in FIG. 9A, the remote controller 90 according to an embodiment of the present invention may include an input unit 910, a memory 920, a communication unit 930, and a processor 940.

According to an embodiment, the input unit 910 may include a control key of the display device 50 and at least one peripheral device 10. For example, the control key may include a first power-on key for powering on the display device 50 and a second power-on key for powering on the at least one peripheral device 10.

According to an embodiment, the memory 920 may store unique identification information of the display device 50 controllable by the remote controller 90 and unique identification information of the at least one peripheral device 10 and an instruction corresponding to each control key. The instruction may include, for example, power-on instructions for the display device 50 and each peripheral device 10.

According to an embodiment, the communication unit 930 may transmit and receive signals to and from the display device 50 and the at least one peripheral device 10 in response to an instruction from the processor 940. For example, the communication unit 930 may receive a request of powering on the first peripheral device from the display device 50 and may convert the request into a form interpretable by the processor 940. The communication unit 930 may transmit the instruction of powering on the first peripheral device from the processor 940 to the first peripheral device.

According to an embodiment, if the first power-on key is operated by the user, the processor 940 may search the memory 920 for the power-on instruction corresponding to the first power-on key. The processor 940 may transmit the searched power-on instruction through the communication unit 930 to the display device 50.

According to an embodiment, if the request of powering on the first peripheral device is received from the display device 50 through the communication unit 930, the processor 940 may power on the first peripheral device by transmitting the power-on instruction to the first peripheral device.

Referring to FIG. 9B, if the operation of the first power-on key is detected in operation 950, in operation 960, the processor 940 may transmit the power-on instruction to the display device 50.

In operation 970, the processor 940 may verify the request of powering on the first peripheral device from the display device 50 or whether at least one of the control keys of the input unit 910 is operated.

In operation 980, the processor 940 may transmit the power-on instruction to the first peripheral device if receiving the request of powering on the first peripheral device from the display device 50. For example, the processor 940 may identify the subject of the power-on instruction by verifying the unique identification information of the first peripheral device in the power-on request. The processor 940 may search the memory 920 for the power-on instruction interpretable by the first peripheral device and may transmit the searched power-on instruction to the first peripheral device.

According to various embodiments, after the user operates the power-on key of the display device provided on the remote controller, the source device may be automatically powered on without any additional operations for powering on the device for providing the source.

Figure 10:
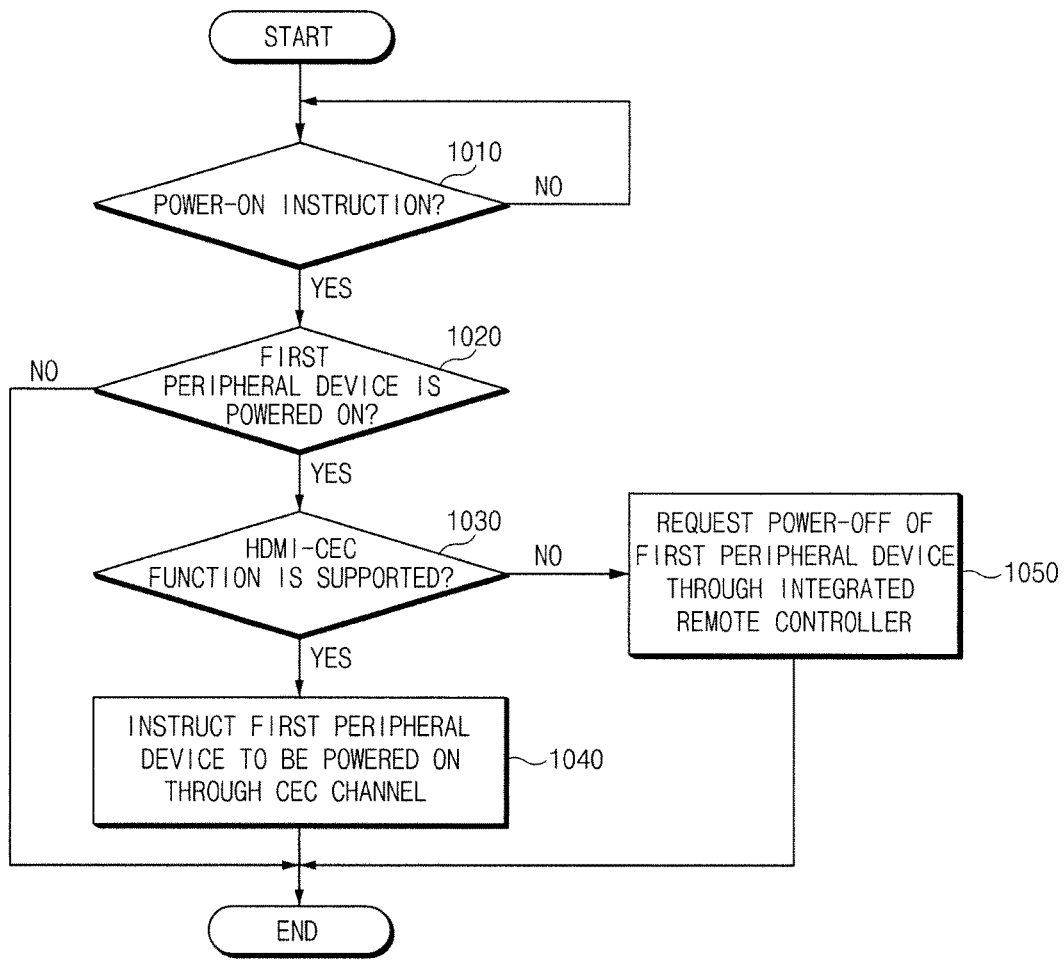
FIG. 10 is a flowchart illustrating a method of controlling a power-off according to an embodiment of the present invention.

According to another embodiment, the display device 50 may power off the first peripheral device before being powered off. FIG. 10 is a flowchart illustrating a method of controlling a power-off according to an embodiment of the present invention.

Referring to FIG. 10, in operation 1010, the processor 560 may verify whether a power-off instruction is received. For example, the power-off instruction may be received from the remote controller 90. As another example, the power-off instruction may be detected by detecting the operation of the power-on button provided to the display device 50.

In operation 1020, if the processor 560 detects the power-off instruction, the processor 560 may verify whether the first peripheral is powered on or off. The processor 560 may verify whether the first peripheral device is powered off, by verifying whether the state transition of the monitoring signal, which is at least one of the TMDS signals from the first peripheral device, is interrupted. In operation 1020, the processor 560 may power off an element for reproducing the source, such as the display 530, the speaker 540 and the like, other than the elements for controlling the power-off of the first peripheral device among the elements included in the display device 50.

In operation 1030, if it is determined that the first peripheral device is in a power-on state, the processor 560 may determine whether the first peripheral device supports the HDMI-CEC function.

In operation 1040, if the first peripheral device supports the HDMI-CEC function, the processor 560 may transmit an instruction of powering off the first peripheral device through the CEC channel of the HDMI. If the first peripheral device receives the power-off instruction through the CEC channel of the HDMI, the first peripheral device may be powered off in response to the corresponding instruction.

In operation 1050, if the first peripheral device does not support the HDMI-CEC function, the processor 560 may request the remote controller 90 to power off the first peripheral device through the second communication unit 555.

The processor 560 may monitor the power-off of the first peripheral device after controlling the power-off of the first peripheral device. For example, the processor 560 may detect the power-off of the first peripheral device according to whether the state transition of the monitoring signal stops.

If the processor 560 fails to verify the power-off of the first peripheral device within the specified third threshold time, the processor 560 may guide a need to power off the first peripheral device in a specified manner. A second guide image may be output. For example, the processor 560 may output a guide image of informing a need to power off the first peripheral device before being powered off.

According to various embodiments, when the display device is powered off, it may be verified whether the first peripheral device is powered on/off. The first peripheral device may be automatically powered off when the first peripheral device is powered on.

The term "module (or unit)" used in the present disclosure may refer to, for example, a unit including one or more combinations of hardware, software, and firmware. The "module" may be interchangeably used with a term, such as, logic, logical block, element, or circuit. The "module" may be the smallest unit of an integrated element or a part thereof. The "module" may be the smallest unit that performs one or more functions or a part thereof. The "module" may be mechanically or electronically implemented. For example, the "module" may include at least one of an Application-Specific Integrated Circuit (ASIC) chip, a Field-Programmable Gate Arrays (FPGA), and a programmable-logic device for performing operations which has been known or are to be developed hereinafter.

At least some of the devices (e.g., modules or functions thereof) or the methods (e.g., operations) according to various embodiments may be implemented by a command stored in a computer-readable storage medium in the form of a programming module. When the command is executed by a processor, the processor may execute a function corresponding to the command. The computer readable recording medium may include a hard disk, a floppy disk, magnetic media (e.g., a magnetic tape), optical media (e.g., CD-ROM or DVD), magneto-optical media (e.g., a floptical disk), and an embedded memory. The instructions may include codes made by a compiler or executable by an interpreter. The module or programming module according to various embodiments may include one or more of the aforementioned elements or may further include other additional elements, or some of the aforementioned elements may be omitted Operations executed by a module, a programming module, or other element elements according to various embodiments may be executed sequentially, in parallel, repeatedly, or in a heuristic manner. Further, some operations may be executed according to another order or may be omitted, or other operations may be added. Meanwhile, the embodiments disclosed in the specification are merely presented to easily describe the technical contents of the present disclosure and help with the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

According to various embodiments, the convenience of powering a display device and a peripheral device may be improved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display device comprising:
   a first communication unit configured to communicate with a peripheral device;
   a second communication unit configured to communicate with a remote controller; and
   at least one processor operatively connected to the first and second communication units,
   wherein the at least one processor is configured to
      be initialized in response to a power-on instruction received through the second communication unit from the remote controller,
      after being initialized in response to the received power-on instruction,
         communicate with the peripheral device through the first communication unit to determine whether or not the peripheral device is powered on within a first threshold time,
         determine whether the peripheral device supports a High-Definition Multimedia Interface Consumer Electronic Control (HDMI-CEC) function,
         when it is determined that both (a) the peripheral device is not powered on within the first threshold time, and (b) the peripheral device does not support the HDMI-CEC function, transmit, to the remote controller through the second communication unit, a power-on request for allowing the remote controller to power on the peripheral device, and
         when it is determined that both (a) the peripheral device is not powered on within the first threshold time, and (b) the peripheral device does support the HDMI-CEC function, cause the peripheral device to be powered on by the display device through the HDMI-CEC function,
      wherein the peripheral device is operable to provide video signals and/or audio signals to the display device, and
      wherein the at least one processor is configured to
         transmit a signal for resetting the peripheral device after being initialized, and
         determine whether or not the peripheral device is powered on within the first threshold time by
            determining whether or not at least one of a data signal and a clock signal is received by the display device within the first threshold time from a first time point when the signal for resetting is transmitted, and
            determining that the peripheral device is powered on within the first threshold time when it is determined that the at least one of the data signal and the clock signal is received by the display device within the first threshold time from the first time point.

2. The display device of claim 1, wherein the at least one processor is configured to determine the first threshold time by learning a time required from the first time point to a second time point when the at least one of the data signal and the clock signal is received by the display device.

3. The display device of claim 2, wherein the at least one processor is configured to determine the first threshold time by learning the required time every time when the at least one processor is initialized.

4. The display device of claim 1, wherein
   the at least one processor is configured to, after being initialized, identify unique identification information of the peripheral device, and
   the power-on request transmitted to the remote controller includes the identified unique identification information.

5. The display device of claim 1, further comprising:
   a display, wherein the at least one processor is configured to
      power off the display when receiving a power-off instruction from the remote controller,
      determine whether or not the peripheral device is powered off within a second threshold time, and
      request the remote controller to power off the peripheral device when it is determined that the peripheral device is not powered off with the second threshold time.

6. A power control system comprising:
   a remote controller including a power-on key and configured to transmit a power-on instruction when the power-on key is operated; and
   a display device including an interface configured to communicate with a peripheral device operable to provide video and/or audio signals to the display device,
   wherein the display device is configured to:
      initialize in response to receiving the power-on instruction,
      after initializing in response to receiving the power-on instruction,
         communicate with the peripheral device through the interface to determine whether or not the peripheral device is powered on within a threshold time,
         determine whether the peripheral device supports a High-Definition Multimedia Interface Consumer Electronic Control (HDMI-CEC) function,
         transmit, to the remote controller, a power-on request to power on the peripheral device, when it is determined that both (a) the peripheral device is not powered on within the threshold time, and (b) the peripheral device does not support the HDMI-CEC function, and
         cause the peripheral device to be powered on by the display device through the HDMI-CEC function, when it is determined that both (a) the peripheral device is not powered on within the threshold time, and (b) the peripheral device does support the HDMI-CEC function,
      wherein the display device is configured to:
         transmit a signal for resetting the peripheral device through the interface after being initialized, and
         determine that the peripheral device is powered on within the threshold time when at least one of a data signal and a clock signal from the peripheral device is received by the display device within the threshold time from a first time point when the signal for resetting is transmitted.

7. The power control system of claim 6, wherein
the display device is configured to, after being initialized, identify unique identification information of the peripheral device,
wherein the power-on request includes the identified unique identification information.

8. The power control system of claim 6, wherein the display device is configured to transmit a signal for resetting the peripheral device through the interface, and to determine the threshold time by learning a time required from a first time point when the signal for resetting is transmitted to a second time point when at least one of a data signal and a clock signal is received by the display device from the peripheral device.

9. The power control system of claim 8, wherein the display device is configured to determine the threshold time by learning the required time every time when the display device is initialized.

10. The power control system of claim 6, wherein the display device is configured to determine that the peripheral device is powered on when at least one of a data signal and a clock signal is received by the display device from the peripheral device through the interface.

11. A method comprising:
being initialized, by a device, in response to a power-on instruction received from a remote controller;
after being initialized in response to the received power-on instruction,
communicating, by the device, with a peripheral device which is operable to provide video signals and/or audio signals, to determine whether or not the peripheral device is powered on within a threshold time,
determining, by the device, whether the peripheral device supports a High-Definition Multimedia Interface Consumer Electronic Control (HDMI-CEC) function,
transmitting, from the device to the remote controller, a power-on request to power on the peripheral device, when it is determined that both (a) the peripheral device is not powered on within the threshold time, and (b) the peripheral device does not support the HDMI-CEC function, and
causing the peripheral device to be powered on by the device through the HDMI-CEC function when it is determined that both (a) the peripheral device is not powered on within the threshold time, and (b) the peripheral device does support the HDMI-CEC function,
wherein the method further comprises:
transmitting, by the device, a signal for resetting the peripheral device through the HDMI after being initialized;
determining, by the device, that the peripheral device is powered on within the threshold time when at least one of a data signal and a clock signal from the peripheral device is received within the threshold time from a first time point when the signal for resetting is transmitted; and
determining, by the device, the threshold time by learning a time required from a first time point when the signal for resetting is transmitted to a second time point when the at least one of the data signal and the clock signal is received by the device.

12. The method of claim 11, wherein the determining of the threshold time is performed at each initialization of the device.

13. The method of claim 11, further comprising:
identifying, by the device, unique identification information of the peripheral device,
wherein the transmitted power-on request includes the identified unique identification information.

* * * * *